(12) United States Patent
Trahey et al.

(10) Patent No.: US 10,969,487 B2
(45) Date of Patent: Apr. 6, 2021

(54) METHODS, SYSTEMS AND COMPUTER PROGRAM PRODUCTS FOR TRIGGERING ULTRASOUND DATA ACQUISITION

(71) Applicant: Duke University, Durham, NC (US)

(72) Inventors: Gregg Trahey, Durham, NC (US); Willie Long, Durham, NC (US); Peter Hollender, Durham, NC (US); David Bradway, Durham, NC (US); Vaibhav Kakkad, Durham, NC (US); Nicholas Bottenus, Durham, NC (US)

(73) Assignee: Duke University

(*) Notice: Subject to any disclaimer, the term of this patent is extended or adjusted under 35 U.S.C. 154(b) by 414 days.

(21) Appl. No.: 16/113,497

(22) Filed: Aug. 27, 2018

(65) Prior Publication Data

US 2020/0064469 A1 Feb. 27, 2020

(51) Int. Cl.
*G01S 15/89* (2006.01)
*G01S 7/52* (2006.01)
*G06T 7/70* (2017.01)
*G06N 5/04* (2006.01)

(52) U.S. Cl.
CPC ...... *G01S 15/8979* (2013.01); *G01S 7/52053* (2013.01); *G06N 5/046* (2013.01); *G06T 7/70* (2017.01); *G06T 2207/10132* (2013.01); *G06T 2207/20081* (2013.01)

(58) Field of Classification Search
CPC ............. G01S 15/8979; G01S 7/52053; G01S 7/52085; G01S 7/52042; G01S 7/52022; G06T 7/70; G06T 2207/20081; G06T 2207/10132; G06N 5/046; G06N 20/00; G06N 7/005
See application file for complete search history.

(56) References Cited

U.S. PATENT DOCUMENTS

2005/0215899 A1* 9/2005 Trahey ................. A61B 5/0048
600/439
2020/0064469 A1* 2/2020 Trahey ................... G06N 5/046

* cited by examiner

*Primary Examiner* — Daniel Pihulic
(74) *Attorney, Agent, or Firm* — Myers Bigel, P.A.

(57) ABSTRACT

Methods of triggering an imaging acquisition of a target region in an ultrasound transducer include: acquiring a first type of ultrasound data with the ultrasound transducer using a first type of ultrasound acquisition; analyzing the first type of ultrasound data to identify an acquisition time and/or position having characteristics that increase an estimated amount of image quality metrics in the target region for a second type of ultrasound acquisition; and generating a signal to initiate acquiring a second type of ultrasound data by the ultrasound transducer at the identified acquisition time and/or position using a second type of ultrasound acquisition in response to the identified acquisition time and/or position identified from the first type of ultrasound data.

21 Claims, 11 Drawing Sheets

METHODS, SYSTEMS AND COMPUTER PROGRAM PRODUCTS FOR TRIGGERING ULTRASOUND DATA ACQUISITION

STATEMENT OF GOVERNMENT SUPPORT

This invention was made with government support under Grant Number 5R37HL096023 awarded by the National Institutes of Health (NIH). The government has certain rights in the invention

FIELD OF THE INVENTION

The present invention relates to ultrasound imaging and analysis, and in particular, to methods, systems and computer program products for acquiring ultrasound data of a first data type triggering ultrasound data acquisition of a second data type based on the acquired ultrasound data of the first type.

BACKGROUND

Ultrasound imaging has many medical applications, including diagnostic imaging and non-diagnostic imaging, for example, to guide and inform other medical procedures. Conventional B-mode imaging is a two-dimensional ultrasound imaging composed of dots of variable brightness representing the amplitude of ultrasound echoes, harmonic ultrasound imaging. Harmonic ultrasound imaging utilizes the harmonic waves generated from nonlinear distortions during the transmit phase of the pulse-echo cycle. Acoustic Radiation for Impulse (ARFI) imaging interrogates the tissue response of a high-energy ultrasound pulse by a pulse-echo cycle to characterize tissue stiffness. Shear Wave Elasticity Imaging (SWEI) uses a focused high-energy ultrasound pulse to generate shear waves that travel transversely away from the excitation and uses the propagation of the shear wave to characterize tissue stiffness.

Some ultrasound imaging techniques, such as ARFI and SWEI, use higher energy ultrasound pulses to generate movement of tissue. It may be advantageous to select the acquisition time and the acquisition position of the ultrasound transducer to increase the image quality to reduce the patient acoustic energy exposure according to the ALARA (As Low as Reasonably Achievable) principle. However, sonographers may have difficulty selecting an optimized position and time to perform efficient scans, which may increase patient exposure to acoustic energy. Moreover, many sonographers experience pain while performing scans due to the need to operate the control panel of the ultrasound device while also positioning the ultrasound transducer to reach an optical imaging window.

SUMMARY OF EMBODIMENTS OF THE INVENTION

In some embodiments, methods for triggering an imaging acquisition of a target region in an ultrasound transducer include: acquiring a first type of ultrasound data with the ultrasound transducer using a first type of ultrasound acquisition; analyzing the first type of ultrasound data to identify an acquisition time and/or position having characteristics that increase an estimated amount of image quality metrics in the target region for a second type of ultrasound acquisition; and generating a signal to initiate acquiring a second type of ultrasound data by the ultrasound transducer at the identified acquisition time and/or position using a second type of ultrasound acquisition in response to the identified acquisition time and/or position identified from the first type of ultrasound data.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF EMBODIMENTS OF THE INVENTION

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. For example, the term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable non-transient storage medium having computer-usable or computer-readable program code embodied in the medium for use by or in connection with an instruction execution system.

The computer-usable or computer-readable medium may be, for example but not limited to, an electronic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Embodiments according to the present invention are described herein with reference to the term "tissue." It will be understood that the term tissue can include biological materials, such as, blood, organs, vessels, and other biological objects found in a body. It will be further understood that embodiments according to the present invention may be applicable to humans as well as other species. Embodiments according to the present invention may also be utilized to image objects other than tissue.

It will be understood that the scope of the present invention includes, for example, two dimensional (2D) ultrasound imaging and 3D (or volumetric) ultrasound imaging. In addition, the components of the ultrasound imaging described herein may be packaged as a single unit or packaged separately and interconnected to provide the functions described herein.

Embodiments according to the present invention are also described by reference to Acoustic Radiation Force Imaging (ARFI) which is described in greater detail, for example, in U.S. Pat. No. 6,371,912, the entire disclosure of which is incorporated herein by reference. An acoustic radiation force may be used to apply a force to tissue thereby causing the tissue to move in the direction of the force and/or to generate a shear wave.

As used herein, a "shear wave" is a form of sample displacement in which a shear wave source, such as ultrasound energy, is transmitted into the sample in one direction and generates an extended shear wave the propagates in another direction that is substantially orthogonal to the direction of the shear wave source. The displacement caused by a shear wave source may be in a range between about 0.1 µm and about 300 µm. Other displacements can be provided. Shear wave imaging or shear wave ultrasound data refers to ultrasound imaging or data that utilizes parameters from the generation of a shear wave, including "time of arrival" measurements, which refer to the measured elapsed time between the transmission of a transmitting signal and the return of a corresponding reflected signal. The time of arrival and other shear wave data are measured by conventional measurement techniques.

Figure 1:
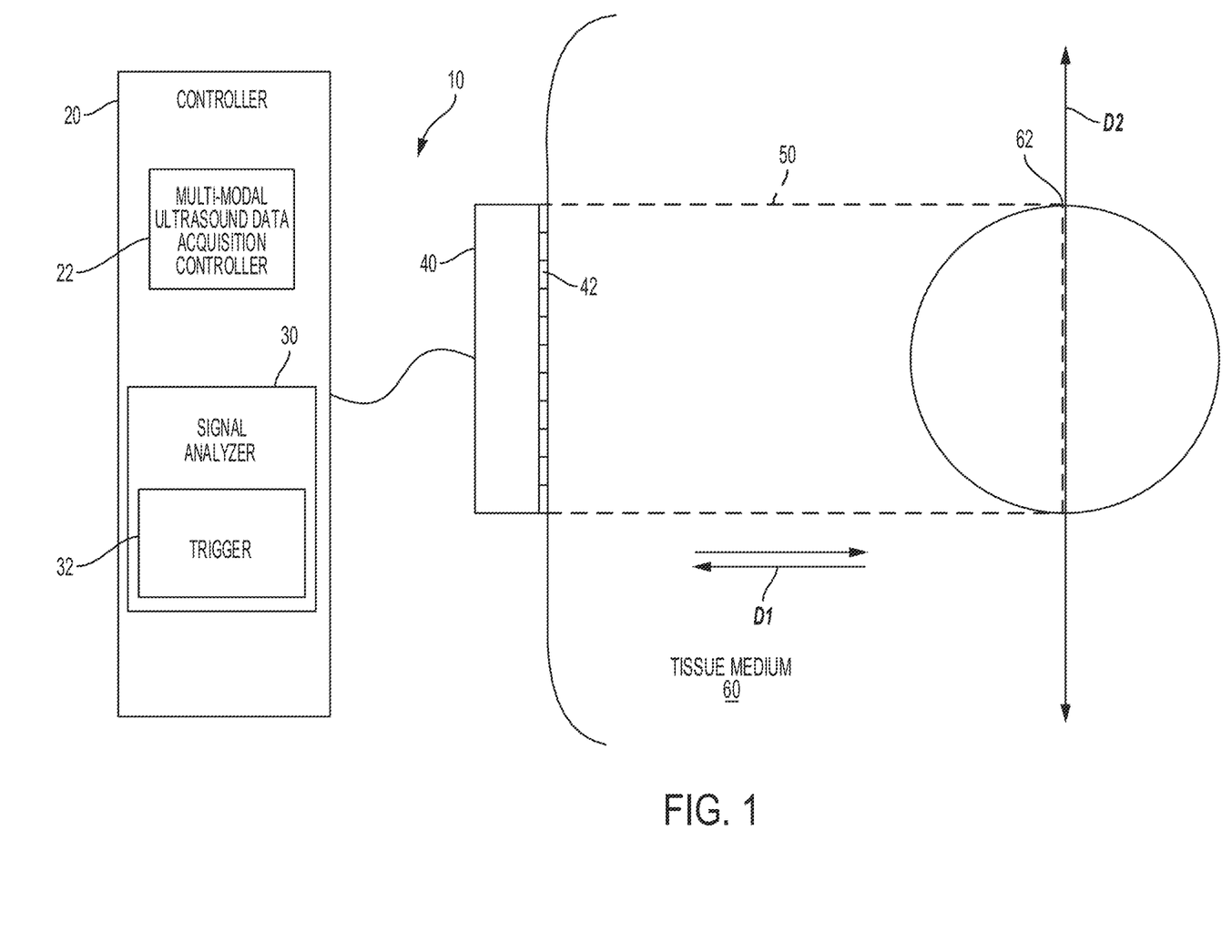
FIG. 1 is a schematic diagram of ultrasound systems, methods and computer program products according to some embodiments.

As illustrated in FIG. 1, an ultrasound system 10 includes a processor 20 having a signal analyzer 30 and an ultrasound transducer array 40. The ultrasound transducer array 40 may include a plurality of array elements 42. The array elements 42 are configured to transmit and receive ultrasound signals 50, and may be contacted to a target medium such as a tissue medium 60. As illustrated, the tissue medium 60 includes a target region 62. As illustrated, the ultrasound array 40 may include ultrasound array elements 42 that define transmit/receive locations for transmitting and receiving ultrasound signals along a direction D1. The ultrasound transducer 40 may be configured to be controlled by the processor 20 and the controller 22 to transmit and detect ultrasound signals according to various types of ultrasound data, including B-mode imaging, harmonic imaging, ARFI imaging, SWEI imaging and the like. In some embodiments, the array 40 may be configured to transmit sufficient ultrasound energy, for example, by applying an impulse excitation acoustic radiation force to the medium 60 for ARFI imaging and/or to generate a shear wave that propagates in a direction D2 that is orthogonal to D1. The array 40 may be configured to interrogate the tissue medium 60, for example, using ARFI, SWEI, harmonic or B-mode imaging techniques. ARFI imaging is discussed in U.S. Pat. Nos. 6,371,912; 6,951,544 and 6,764,448, the disclosures of which are hereby incorporated by reference in their entireties. Shear waves are discussed in U.S. Pat. Nos. 8,118,744 and 6,764,448, the disclosures of which are hereby incorporated by reference in their entireties. The ultrasound transducer array 40 may be a one-dimensional array configured to generate two-dimensional images or the ultrasound transducer array 40 may be a two-dimensional array configured to generate three-dimensional images.

The processor 20 may include a multi-modal ultrasound data acquisition controller 22 and the signal analyzer 30 may include a trigger 32 for changing the acquisition mode of the controller 22. The multi-modal ultrasound data acquisition controller 22 and the signal analyzer 30 and trigger 32 may be configured to control the array 40 and/or to analyze echo signals received by the array 40 as described herein. The multi-modal controller 22 and the trigger 32 may include hardware, such as control and/or analyzing circuits, and/or software stored on a non-transient computer readable medium for carrying out operations described herein.

Figure 2:
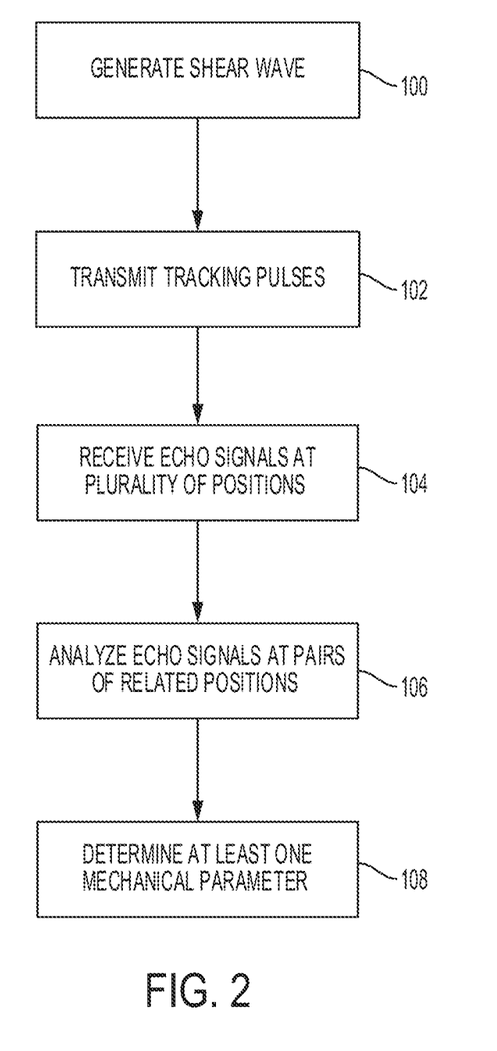
FIG. 2 is a flowchart illustrating operations according to some embodiments.

As illustrated in FIG. 2, a first type of ultrasound data may be acquired by the multi-modal ultrasound data acquisition controller 22 with the ultrasound transducer 40 using a first type of ultrasound acquisition (Block 100). The first type of ultrasound data is analyzed by the signal analyzer 30 to identify an acquisition time and/or position having characteristics that increase an estimated amount of image quality metrics in the target region for a second type of ultrasound acquisition (Block 110). A signal is initiated by the trigger 32 to initiate acquiring a second type of ultrasound data by the control 22 at the ultrasound transducer 40 at the identified acquisition time and/or position using a second type of ultrasound acquisition in response to the identified acquisition time and/or position identified by the signal analyzer 30 from the first type of ultrasound data (Block 120).

In this configuration, one type of ultrasound data can be used as a trigger for the controller 22 to switch modes to another type of ultrasound data acquisition.

In some embodiments, the first type of ultrasound data may be a lower energy ultrasound acquisition mode, such as B-mode imaging or harmonic imaging, and the second type of ultrasound data acquisition may be a higher energy ultrasound acquisition mode, such as ARFI or SWEI acquisition. The first type of ultrasound data may be analyzed to identify an acquisition time and/or position having characteristics that increase an estimated amount of image quality metrics in the target region for a second type of ultrasound acquisition. For example, a machine learning classifier having a database of the first type of ultrasound data and correlated quality metrics of the second type of ultrasound data may be used. In particular embodiments, the acquired second type of ultrasound data may be scored based on quality metrics to train the machine learning classifier based on analysis of the first type of ultrasound data acquired prior to the acquired second type of ultrasound data and the score of the acquired second type of ultrasound data. For example, parameters of B-mode image data or harmonic ultrasound data acquired before corresponding ARFI or SWEI scans may be used to determine parameters of B-mode image or harmonic ultrasound data that increase a likelihood of acquiring a higher quality ARFI or SWEI scan. In particular embodiments, the parameters of the first scan may include a prediction of movement in the target region, such as selecting a time during a cardiac cycle or respiration that reduces tissue movement for the second type of ultrasound scan or data acquisition. The parameters of the first scan may also include an image quality of the first type of ultrasound data, which may predict a similar image quality of the second type of ultrasound data.

An example of parameters of the first type of ultrasound data that may be used as a prediction of image quality is the "Lag One Coherence" (LOC). The LOC is a correlation coefficient between dynamic-receive-focused radio-frequency (RF) echoes from pairs of neighboring elements on the transducer array 40. Spatial coherence at "lag one" or adjacent ultrasound elements may be used as a prediction of the local signal-to-clutter level or image quality, and may be used for feedback to adjust imaging parameters in the presence or absence of temporal noise. Imaging parameters that may be adjusted to improve the prediction of image quality as predicted by characteristics evaluation, such as the LOC calculation, include the scan voltage, selected scanning harmonics, focal location, frame rate, frequency transmit power and detected timing parameters or patterns, such as changes in predicted mage quality due to tissue movement (e.g., cardiac cycle). In some embodiments, these imaging parameters may be changed automatically by the ultrasound transducer controller 22 until the prediction of image quality is increased to above a given threshold or optimized, or a user may change the imaging parameters manually. Additional imaging parameters that may change the prediction of image quality include a location of the ultrasound transducer array 40, pressure applied to the array 40 on the tissue, and other timing parameters.

Moreover, individual patients may have unique scanner settings that optimize image quality and that may be determined using spatial and temporal coherence metrics, such as LOC.

In some embodiments, the quality of the data according to the second type of ultrasound data may be increased while also reducing the number of scans and the amount of ultrasound radiation to which the patient is exposed, e.g., to the "as low as reasonably achievable" standard.

In some embodiments, the ultrasound scan according to the second type of ultrasound data may be automatically acquired without requiring further input from the ultrasound operator. This may improve user ergonomics as the operator does not need to reach a separate control to initiate the second type of ultrasound scan.

In some embodiments, the ultrasound data acquired as described herein can be used to quantify the stiffness of tissues and/or organs, which may be useful in the clinical setting to track the progression of disease and to monitor the response of diseased tissues to treatments (e.g., drug regimens, diet/lifestyle changes, chemotherapy, and radiotherapy). The techniques described herein can be used to characterize the stiffness of biological tissues using their dynamic displacement response to impulsive acoustic radiation force excitations. This may allow for absolute and relative quantification of tissue stiffness to aid in clinical treatment of a variety of pathologic conditions, such as liver disease (e.g., liver steatosis, liver fibrosis and cirrhosis), atherosclerosis, benign prostatic hypertrophy (BPH), muscular dystrophy, products of ablation, cancer in various organs/tissue, thyroid disease and/or skin diseases. Accordingly, the tissue sample may be an in vivo human tissue sample. The ultrasound data can be detected and/or generated using an internally inserted ultrasound probe array (such as an ultrasound probe array configured for insertion into an orifice of the body) or with an externally applied ultrasound array.

The ultrasound data may be used to calculate mechanical parameter(s) of the sample and can be correlated to measurement of healthy/diseased tissue states, such as by using actual clinical data and known healthy/diseased tissue states. The clinical data can be based on other factors such as demographic information, e.g., age, gender and race, to correlate the measurement of the mechanical parameter(s) with a measurement of healthy/diseased tissue states in a particular demographic group.

In some embodiments, the mechanical parameter(s) of the sample can be monitored as a function of time by performing the multi-resolution analyzing techniques on a sample repeatedly over a period of time. A healthy/diseased tissue state determination can be based on a change in the mechanical parameter(s) as a function of time. For example, the mechanical parameter(s) can be monitored over a period of minutes, hours, days, weeks, months or even years to determine the progression of the disease and/or the efficacy of treatment.

In some embodiments, the ultrasound data may be used to form an ultrasound image, such as a B-mode image, harmonic image, a SWEI image or an ARFI image.

Embodiments according to the invention will now be described with respect to the following non-limiting examples.

EXAMPLES

The Lag One Coherence (LOC) is the correlation coefficient between dynamic-receive-focused radio-frequency (RF) echoes from pairs of neighboring, or lag one, elements. Experiments and simulations explore the relationship between spatial coherence and multiple scattering, phase aberration, off-axis targets and temporally random, or electronic noise. Without wishing to be bound by theory, it is currently believed that the spatial coherence at "lag one" or neighboring ultrasound elements is highly predictive of the local signal-to-clutter level (i.e. image quality) and can be used for feedback to adjust imaging parameters in the presence or absence of temporal noise. Moreover, individual patients may have unique scanner settings that optimize image quality and that can be determined using measured spatial and temporal coherence metrics as described below.

Methods:

Data acquisition was performed on eight suspected-normal subjects (labelled A1, A2 . . . ) and three Duke University patients (labelled B1, B2 and B3) undergoing liver biopsy. All were imaged with the Verasonics Vantage 256 research scanner (Verasonics, Redmond, Wash.) using the C5-2v curvilinear array. Custom sequences were designed to enable real-time guidance B-mode followed by a pilot pulse sequence having interleaved B-mode and M-mode channel acquisition pulses during which transmit parameters such as voltage and frequency were varied from frame-to-frame at a rate of 20 frames/sec. B-mode channel data were acquired over 70 lines spanning a 20° field-of-view (FOV). Interleaved M-mode data were acquired at three locations evenly spaced across the span of the B-mode FOV. M-mode firings at each location were repeated 5 times at a 2 KHz PRF. All acquisitions were performed with a 6 cm focal depth and F/2 transmit configuration. Both fundamental and pulse-inversion harmonic imaging were studied but, since harmonic imaging is the dominant imaging mode and in the interest of brevity, only harmonic imaging results are presented with the exception of FIG. 9. It should be understood that although the data were acquired on a Verasonics research scanner, any suitable scanner, including commercially available diagnostic scanners, may be used, for example, by adding additional software capabilities.

Figure 3A:
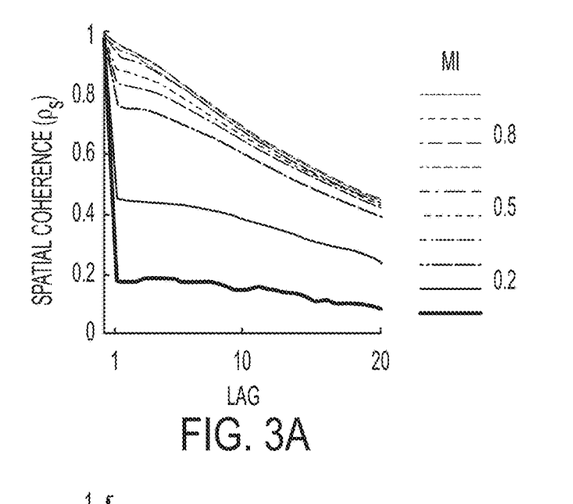
FIGS. 3A-3C are graphs of measure lateral spatial coherence curves for varying mechanical index (MI) for a phantom and two subjects' livers using harmonic imaging.
Figure 3B:
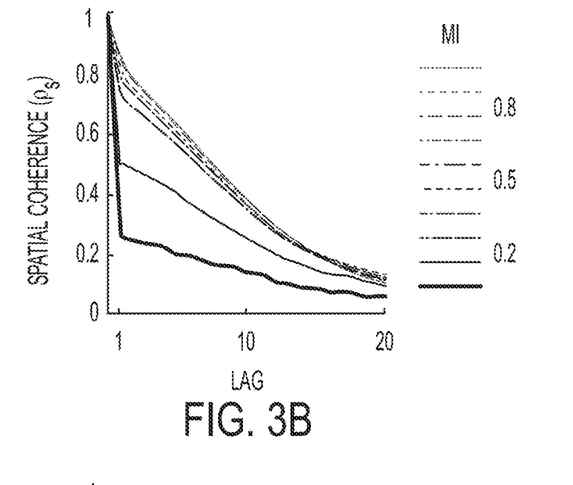
Figure 3C:
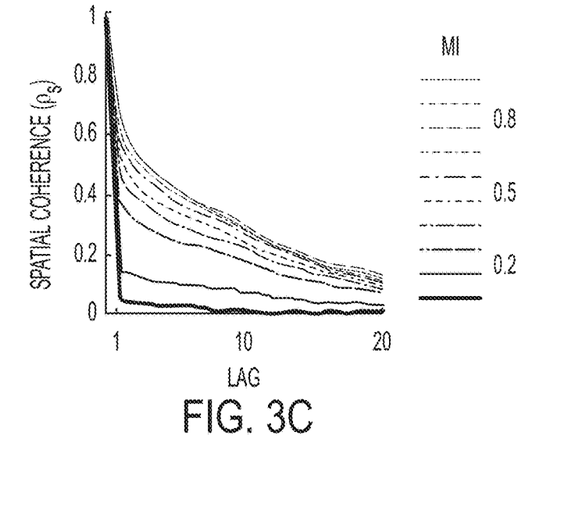
Figure 4A:
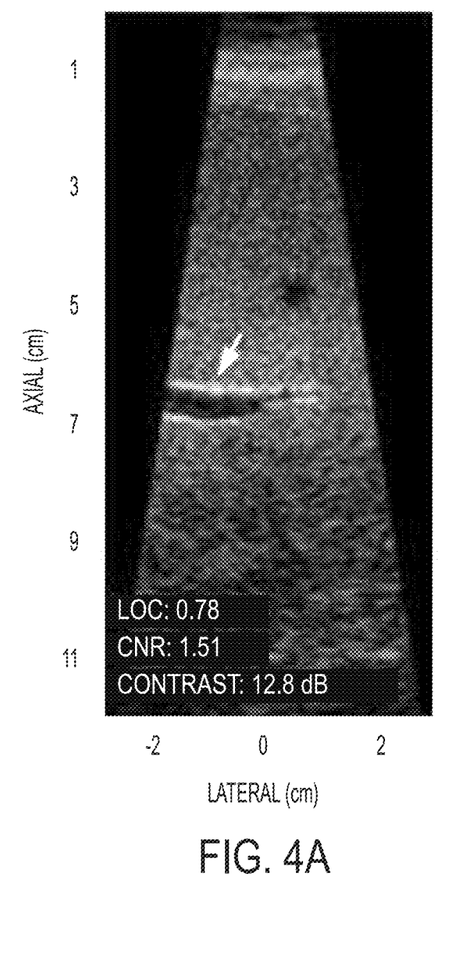
FIG. 4A-4C are representative pulse-inversion harmonic liver images of three subjects.
Figure 4B:
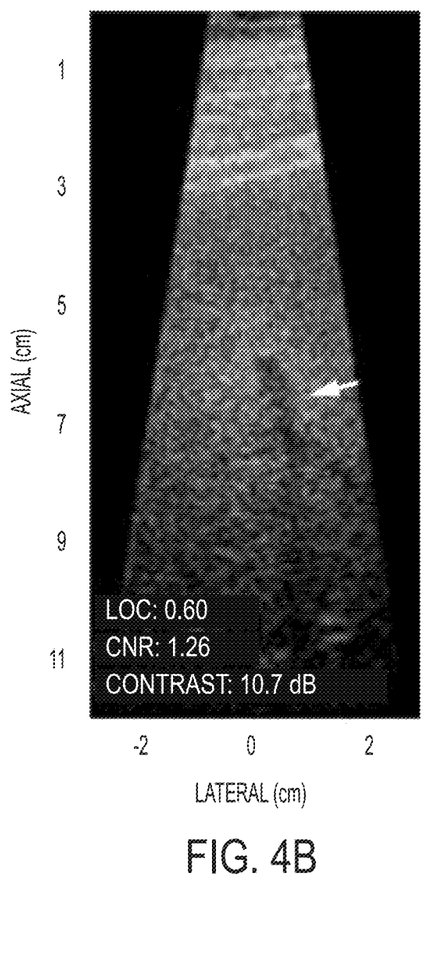
Figure 4C:
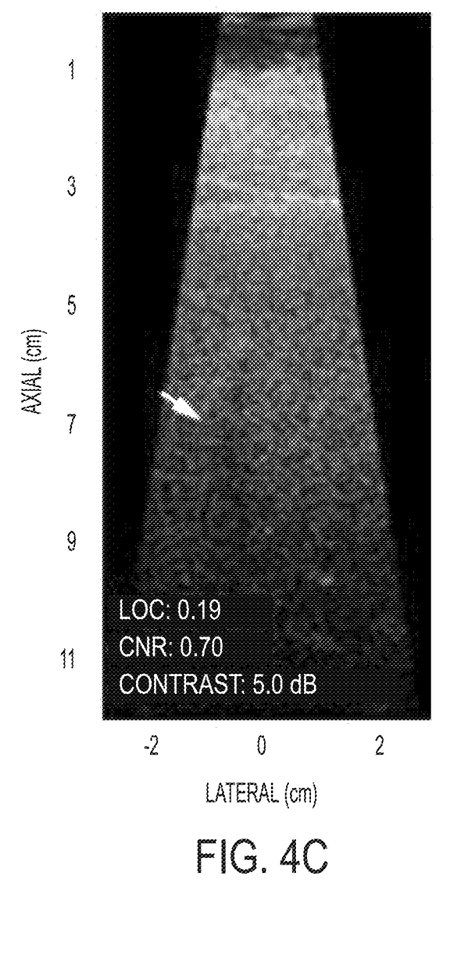
Figure 5A:
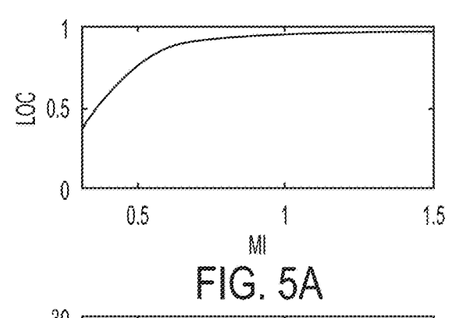
FIGS. 5A-5I are "Lag One Coherence" LOC (FIGS. 5A, 5D, 5G), Contrast (FIGS. 5B, 5E, 5H), and CNR (FIGS. 5C, 5F, 5I), for a phantom and two subjects.
Figure 5B:
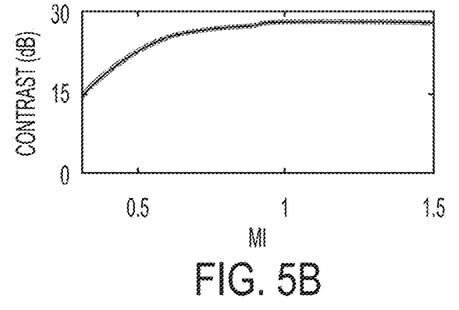
Figure 5C:
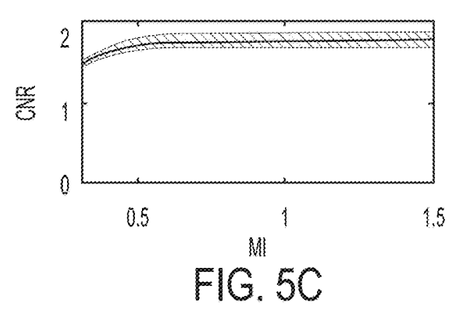
Figure 5D:
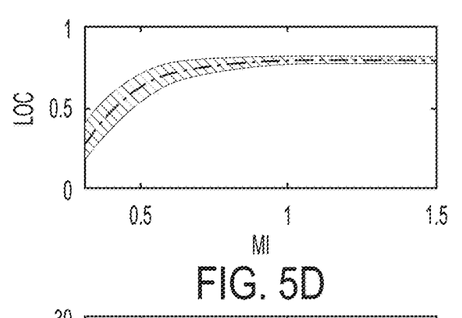
Figure 5E:
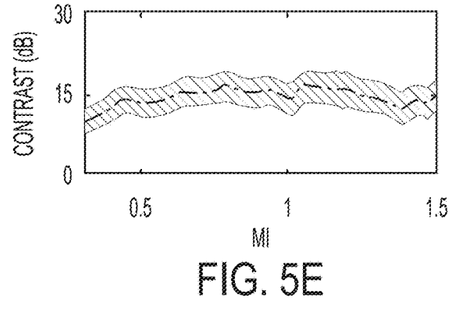
Figure 5F:
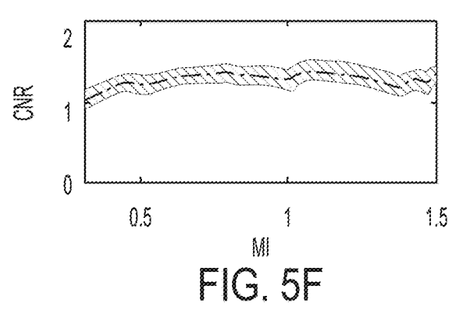
Figure 5G:
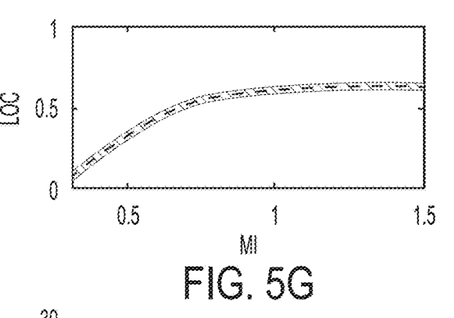
Figure 5H:
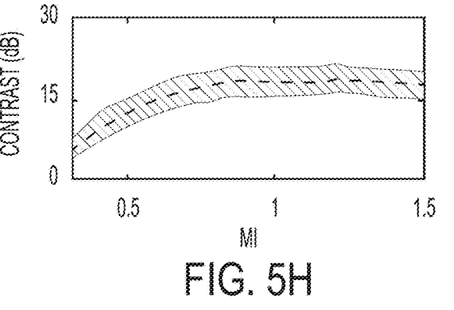
Figure 5I:
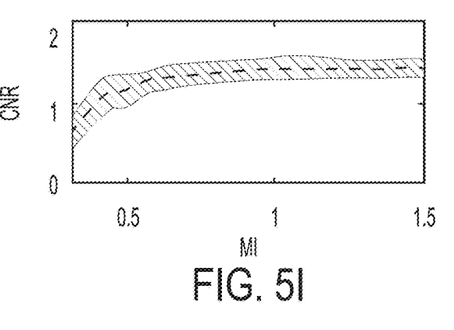

As opposed to contrast and CNR, measurement of LOC does not require the identification of hypo- or hyper-echoic structures in the image; only the tissue background region is necessary. FIGS. 3A-3C show the measured spatial coherence curves from a small (0.5 cm$^2$) liver region for two subjects and a phantom, plotted for a range of MIs. The phantom and Subject A1's coherence curves at high MIs approximate the expected, theoretically predicted linear decrease, while the low MI curves and all of Subject A5's curves show a range of magnitudes of a steep decorrelation at lag one with a roughly linear correlation decrease at higher lags. FIGS. 4A-4C show the corresponding harmonic images for Subjects A1 and A5 and one other subject (A6) demonstrating the decreasing image quality observed with decreasing LOC. The thickness of the abdominal fat layers is visible in FIGS. 4A-4C images and reflects the clinical literature cited above and reporting that thicker fat layers are associated with poor image quality and, in our initial studies, lower values of the LOC. FIGS. 4A-4C also show the vessel contrast and CNR for each image.

MI Selection:

FIGS. 5A-5I shows experimental results comparing contrast, contrast-to-noise ratio (CNR), and LOC as a function of transmit power (MI) for phantom and clinical data. The shaded error bars reflect data from three unique background regions near the focus, while the contrast and CNR plots also necessarily include a manually outlined anechoic lesion (phantom) or blood vessel (in vivo) for calculations. Contrast, CNR and LOC all show a generally monotonic increase in image quality with increasing MI up to an asymptotic limit. The LOC coherence metric benefits from greater sensitivity and reduced variance compared to contrast and CNR. Note that Subject A1's spatial coherence asymptotes at a high coherence level ($\rho \approx 0.8$) at about MI=0.6, while Subject A5 asymptotes at $\rho \approx 0.6$ at around MI=0.9, indicating that Subject A1 requires a lower acoustic power and has higher quality images (i.e. lower clutter levels) than Subject A5. As expected, the phantom yields a very high spatial coherence given its favorable imaging environment.

Figure 6:
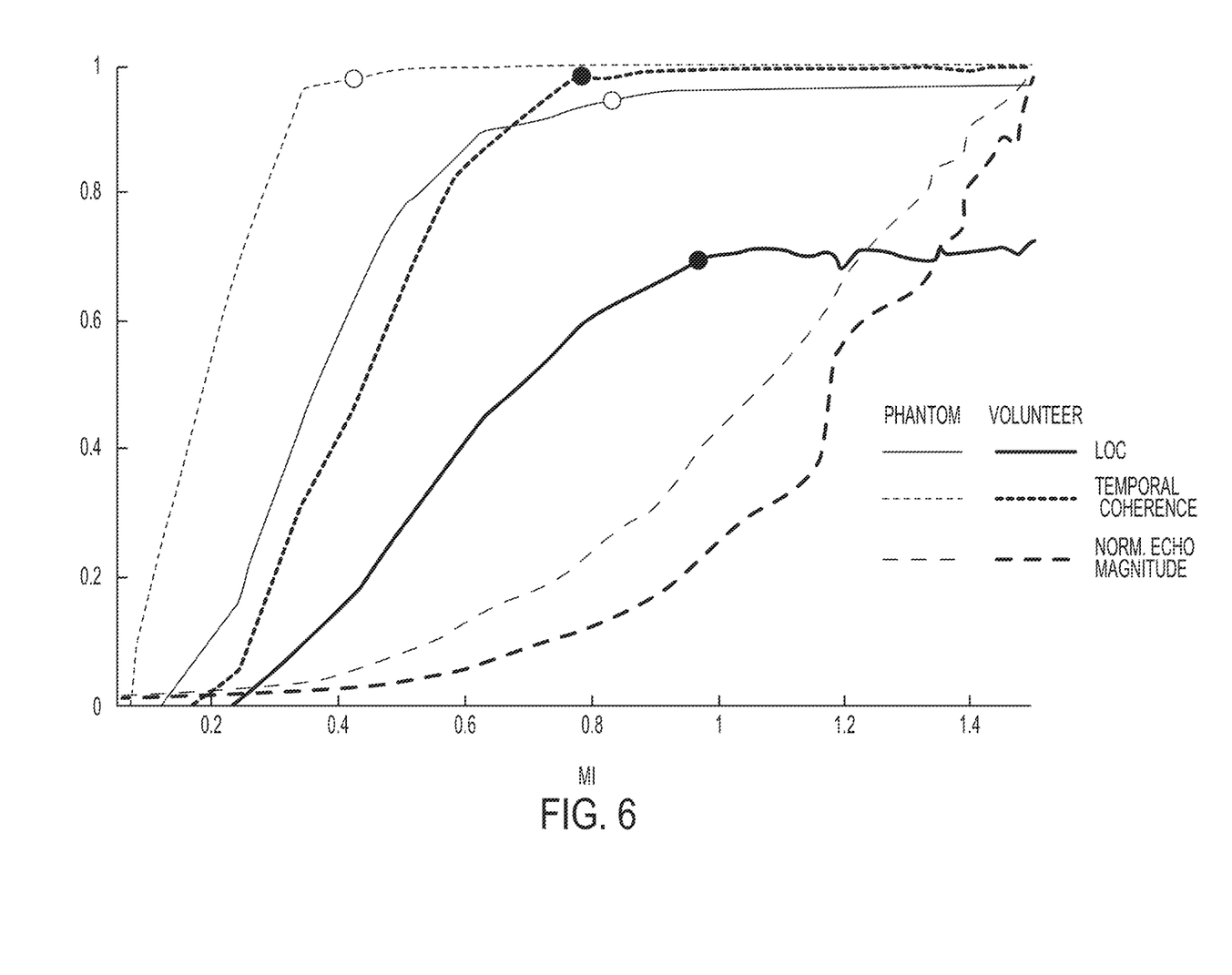
FIG. 6 is a normalized harmonic echo magnitude, temporal coherence and LOC from a phantom and a subject's liver image as a function of mechanical index (MI).

In FIG. 6, temporal coherence, LOC, and echo signal magnitude are plotted as a function of MI for images of an ATS phantom and a 60-year-old male subject's liver. Both temporal coherence and LOC demonstrate asymptotic behavior in image quality with increasing MI, while harmonic echo magnitude continues to increase with MI. The phantom's temporal coherence, reflecting the temporal SNR, asymptotes to a value of 0.98 at an MI of 0.4, while the volunteer requires a transmit power associated with an MI of 0.8 to reach that level. For both the phantom and the in vivo liver echoes, significantly higher MIs (0.8 and 0.95, respectively) are required to reach the spatial coherence asymptote, likely reflecting improved harmonic beamforming at higher power levels. The LOC represents information generally unobtainable from the temporal coherence, since it measures changes in image quality even when the random, electronic noise is negligible.

Figure 7A:
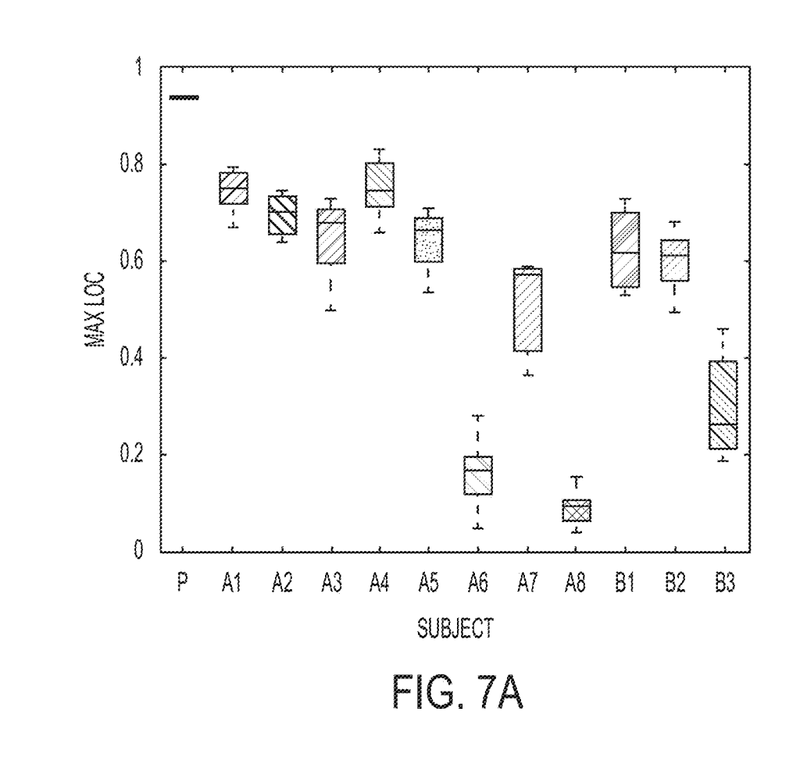
FIG. 7A-7B are bar graphs of the LOC (FIG. 7A) and MI (FIG. 7B) for the phantom and various subjects.
Figure 7B:
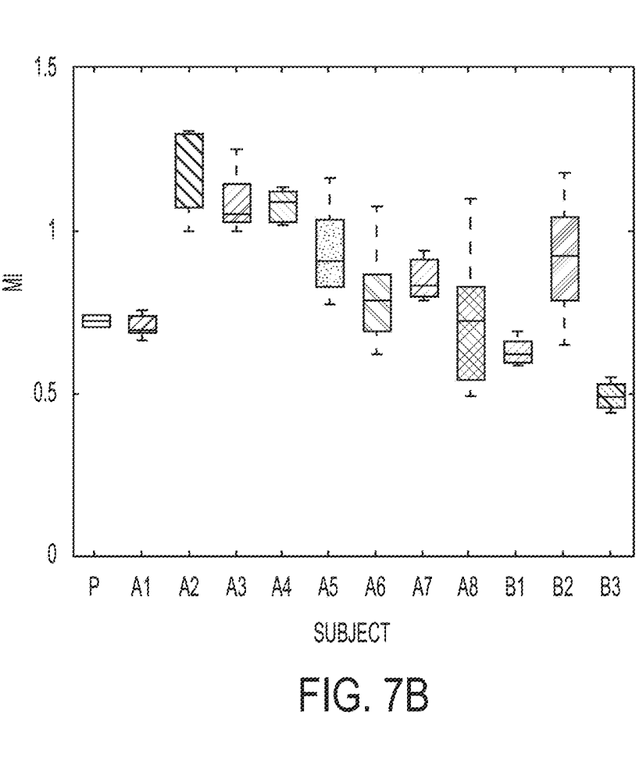

FIG. 7A shows the 0.98 of asymptote value for spatial coherence determined when increasing MI (as obtained from the circles on the LOC curves (solid lines) in FIG. 6 for one volunteer and the phantom), calculated from the ATS phantom and the liver images of eleven subjects and, in FIG. 7B, the MI at which that asymptote was achieved. ALARA may be realized when the MI level at which spatial coherence asymptotes is used for imaging, as shown in FIG. 7B. The relatively small error bars reflect how repeatable the "patient signature" for the maximum spatial coherence and the "best" MI is across unique, adjacent acoustic windows. All measurements were acquired from small (5×5λ) ROIs located within 1 cm of the transmit focus. At many imaging depths, the optimal MI is not offered on current diagnostic scanners. In addition, significantly higher MIs are required to reach asymptotic LOC values away from the transmit focus (see FIG. 8).

Figure 8:
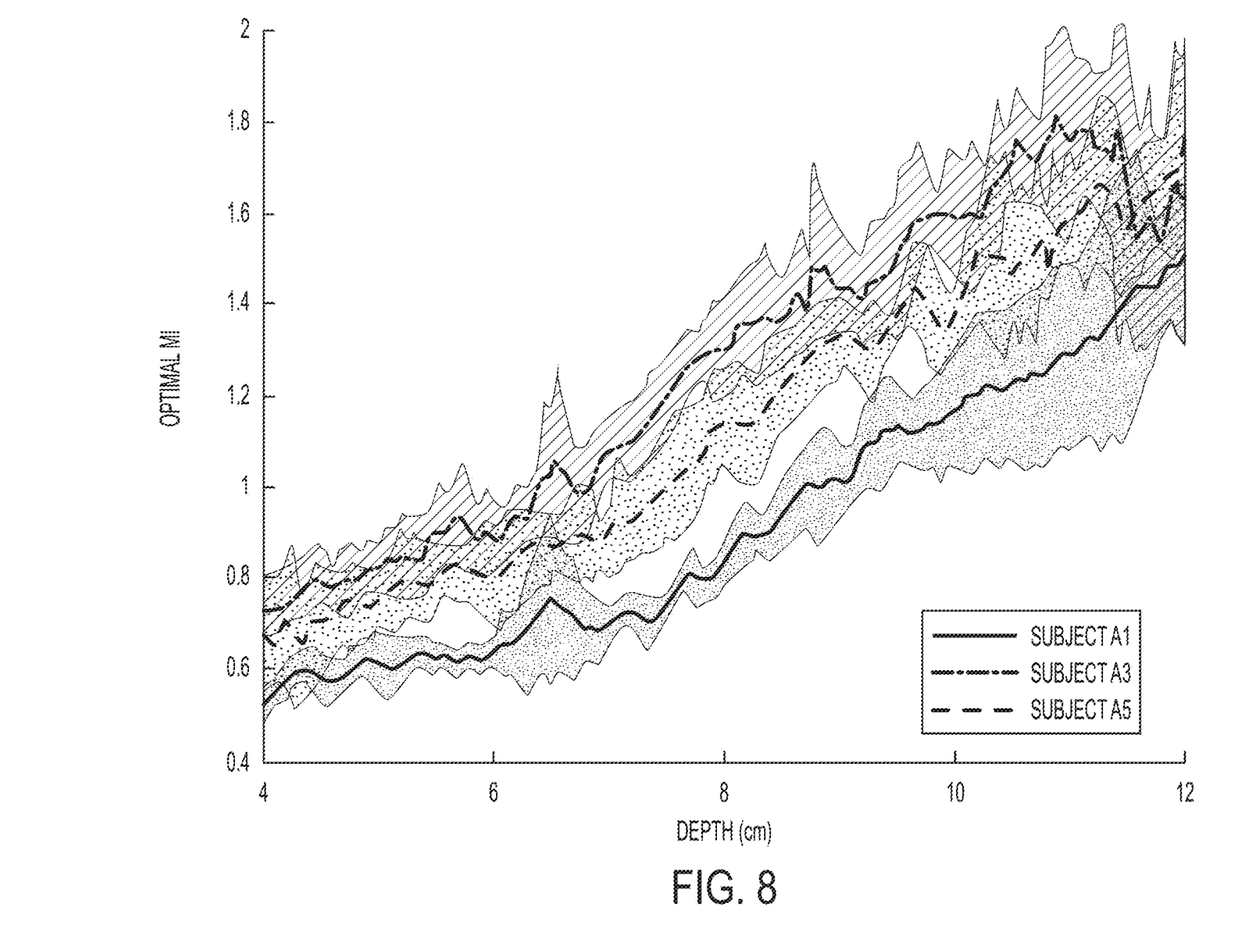
FIG. 8 is a graph of the MI at which the LOC asymptotes as a function of image depth for three subjects with a transmit focus at 6 cm.

FIG. 8 shows the MI at which the measured LOC reaches its asymptotic value as a function of imaging depth for three subjects. The error bars represent the standard deviation for three 5×5λ regions in each of five images acquired at unique acoustic windows. All data were acquired for a 6 cm transmit focal depth. Note that the desired MIs are not available on current scanners for deeper imaging depths, especially for Subjects A3 and A5. For example, Subject A3's image quality would benefit from MIs greater than 1.3 at the focus of 6 cm for targets at 8 cm and deeper. However neither the Siemens nor GE scanner offer that transmit pressure level. Results from our ongoing study of increased MI described above, indicate that an appreciable fraction of patients would also benefit from MIs beyond the FDA limit of 1.9, even for targets at or near the transmit focal range.

Frequency Selection:

In order to explore adaptive selection of frequency and other imaging parameters, it is important to distinguish clutter noise from temporal noise. The magnitude of the lag one decorrelation in FIGS. 1-3 represents the contributions of two additive noise sources: (1) temporally incoherent electronic noise $N_t$ and (2) spatially incoherent clutter noise, $N_s$. These correspond to a temporal signal-to-noise ratio $SNR_t=S/N_t$ and a spatial signal-to-noise ratio $SNR_s=S/N_a$, where $N_a$ represents temporally-stable clutter. Given the temporal coherence $\rho_t$, the temporal SNR is given by $SNR_t=\rho_t/(1-\rho_t)$. Following the derivation of spatial SNR in speckle using two additive noise sources (i.e. spatial and temporal noise) yields:

$$SNR_s = \frac{\rho_s}{\left(1-\frac{n}{N}\right) - \rho_s\left(1+\frac{1}{SNR_t}\right)}, \quad (1)$$

where n is the element separation, or lag, on an N element array. For a given data set, these equations are used with the estimated spatial and temporal coherences, $\rho_s$ and $\rho_t$ respectively, to calculate the total $SNR_s$ and then reverse the calculation to solve for the spatial coherence in the limit of $SNR_t \to \infty$.

$$\hat{\rho}_s = \frac{1-\frac{n}{N}}{1+\frac{1}{SNR_s}} = LOC \quad (2)$$

This isolates the impact of the clutter noise signal ($N_s$), giving a prediction of the maximum attainable spatial coherence ($\rho_s$), or image quality, at high MI values, and allowing us to design low MI pilot pulse sequences. Since temporal noise may be measured from a few M-mode lines and spatial coherence from the same pulses' individual channel echo signals, we can estimate the expected spatial coherence that can be achieved assuming an infinite temporal SNR from data obtained at any level of temporal noise. Note that $SNR_s$ in Eqn. 2 represents the signal-to clutter level of the image, which our studies indicate strongly predicts image quality. The LOC is $\rho_s$ at lag one. We will use LOC to represent $\hat{\rho}_s$, or the LOC with the contribution of temporal noise removed.

Figure 9A:
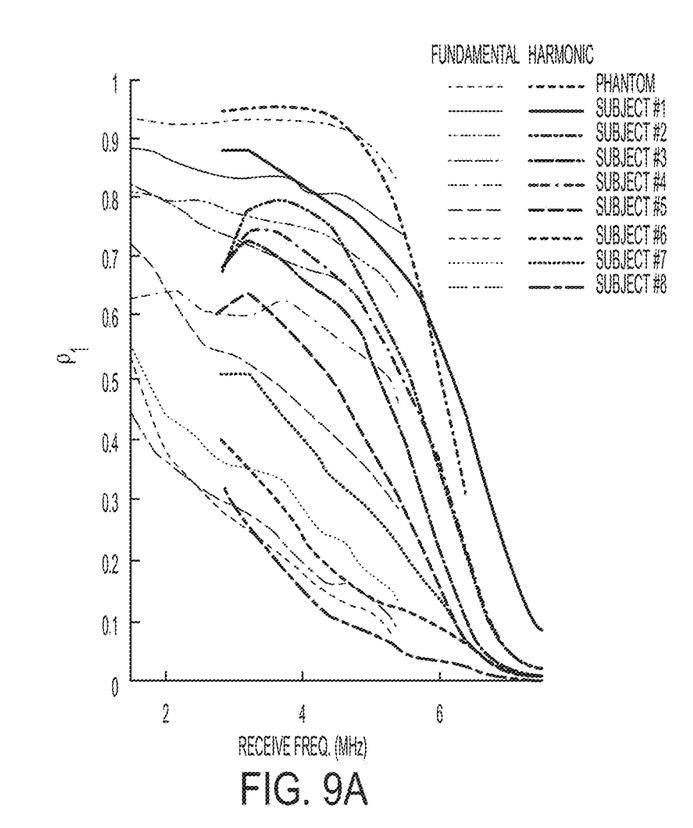
FIGS. 9A-9D are graphs of the LOC as a function of image frequency for eight subjects and the phantom.
Figure 9B:
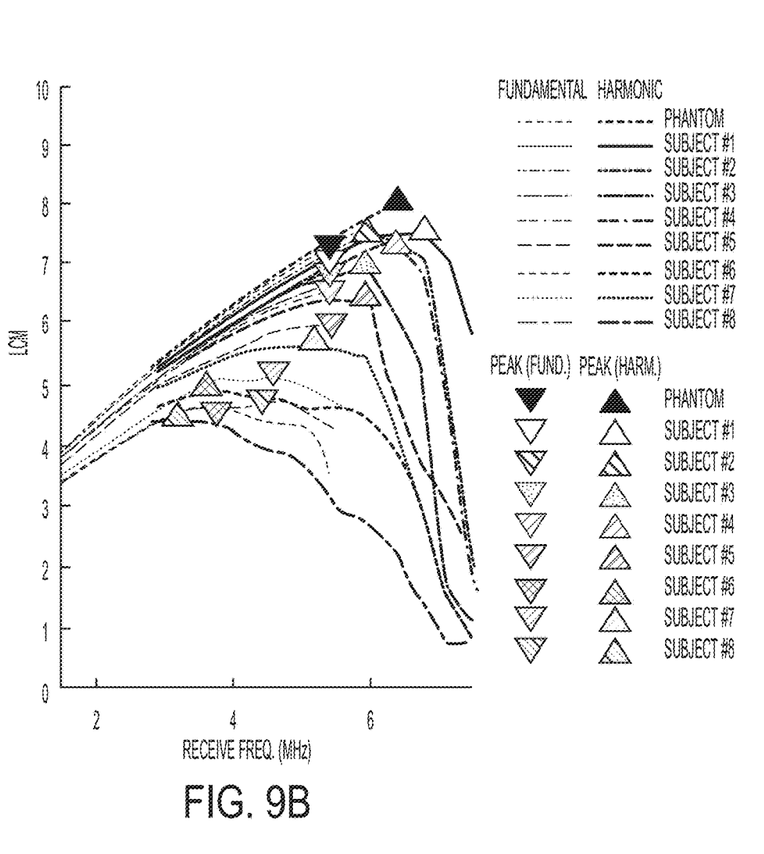
Figure 9C:
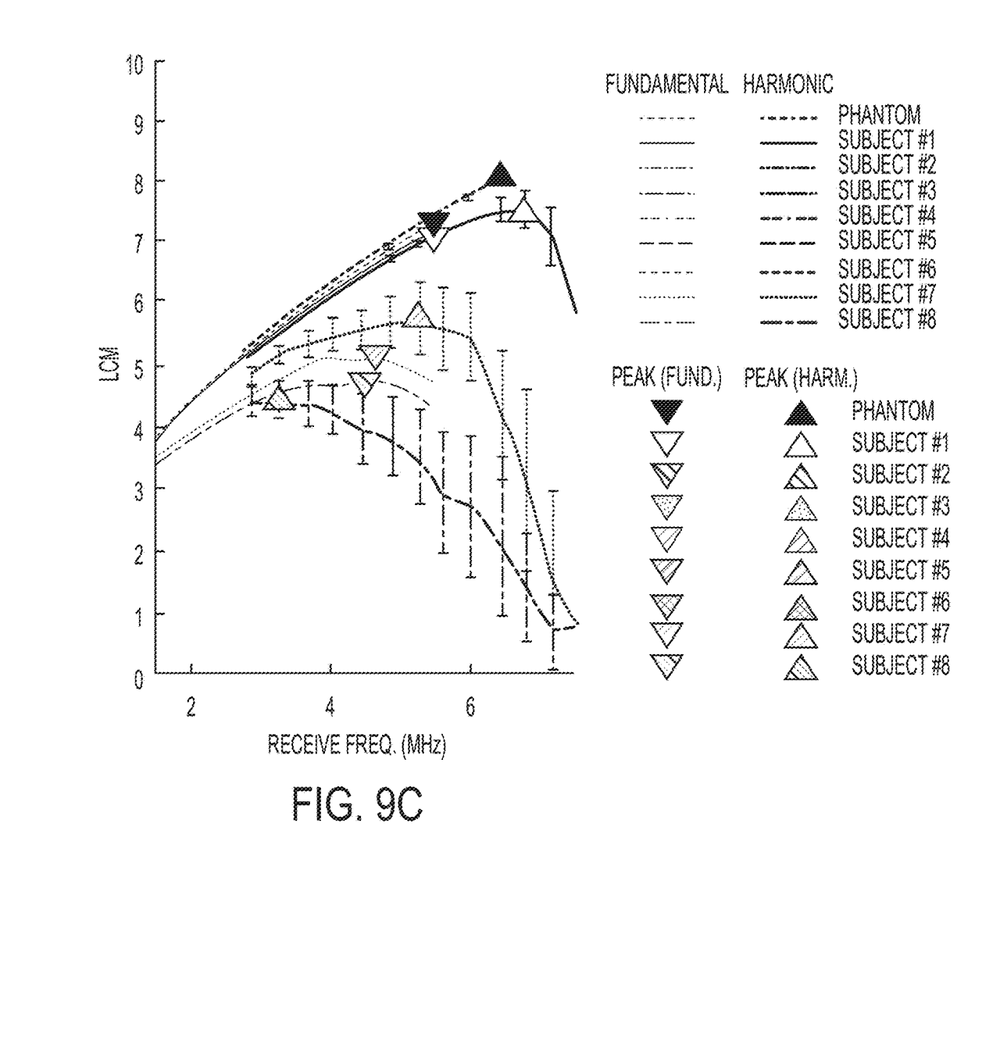

Rather than exploring frequency space with high MI pulses that minimize temporal noise, we propose to measure LOC and temporal noise levels with low MI pulses to minimize patient exposure and use Eqn. 2 to calculate LOC. FIG. 9A shows LOC, the "noise-corrected" LOC or $\hat{\rho}_s$, from Eqn. 2 and based on the measured LOC and temporal noise as a function of receive frequency for the phantom and eight subjects. The solid lines represent pulse inversion harmonic imaging and the dotted lines reflect fundamental imaging for each subject. All results show a general trend of decreasing LOC, reflecting increased clutter, with increased frequency. Also, in general, all results reflect a decreased clutter level for harmonic imaging compared to fundamental imaging for the same subject and frequency. FIGS. 9B and 9C show the calculated image quality as a function of frequency as reflected by the Lesion Conspicuity Metric (LCM).

$$LCM = \frac{C_\psi dN^{1/2}}{(S_{cx} \cdot S_{cz})^{1/2}}, \quad (3)$$

where $C_\psi$ and d are the contrast and diameter of the lesion. $S_{cx}$ and $S_{cz}$ are the lateral and axial resolution respectively. N is the number of independent images to be spatially or frequency compounded. Although derived from first principles for an ideal observer, the LCM agrees well with human observer studies. Use of the LCM allows us to quantify expected changes in lesion conspicuity not only with varying LOC, but also with simultaneously varying imaging frequency, aperture size, lesion contrast and size, and with different realizations of spatial and frequency compounding. Using Eqn. 3, we can account for the impact of variable imaging frequency and the measured spatial coherence in FIG. 9A on the LCM to yield the results in FIGS. 9B and 9C. We use Eqn. 2 to calculate the signal-to-clutter level at a given spatial coherence and to calculate the lesion contrast, $C_\psi$, in Eqn. 3. The contrast improvement is calculated from the increase in signal-to-clutter level associated with the LOC increase measured at higher MIs. Eqn. 2 relates the LOC to the signal-to-clutter level ($SNR_s$) and we have derived the relationship between signal-to-clutter level and lesion contrast. Our ex vivo tissue studies and numerical simulations indicate that diffraction-limited resolution is maintained in clinical scans, even when using large apertures. We use this result to scale the expected lateral resolution ($S_{CZ}$ in Eqn. 3) as a function of frequency.

Figure 9D:
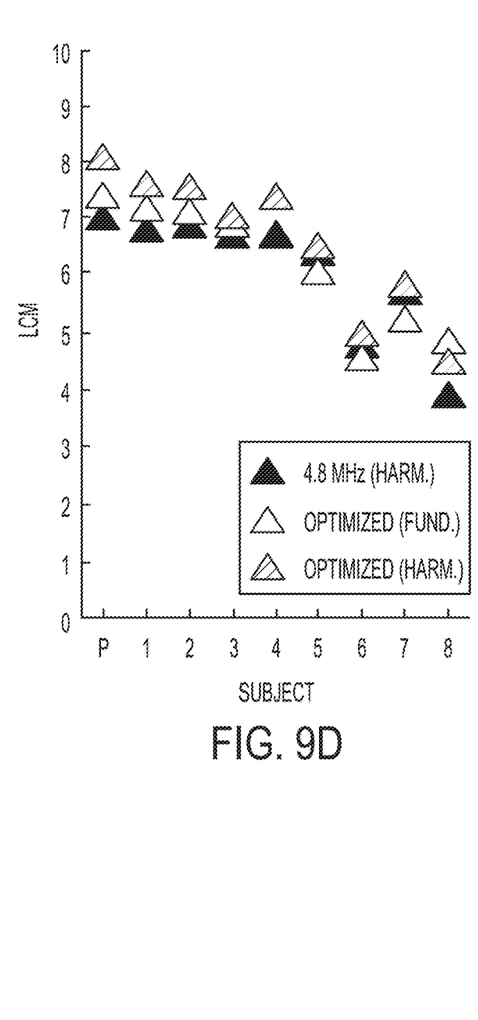

FIGS. 9B and 9C show the results of these operations and quantify the expected image quality as a function of imaging frequency for each subject for both fundamental and harmonic imaging. The triangles represent the frequency at which maximum lesion conspicuity is realized for each patient for both fundamental and harmonic imaging modes. FIG. 9C shows a subset of (B)'s data for clarity and includes representative error bars for the LCM using five unique acoustic windows for each subject. FIG. 9D compares the LCM values for the default (4.8 MHz) vs. "optimized" imaging frequency for each patient, quantifying the image quality improvements when the adaptively-selected "optimized" frequency is used. The results show a 12%+/−8% improvement in LCM when the "optimized" frequency is used, calculated for a −20 dB, 0.5 cm lesion.

The results in FIGS. 9A-9D indicate that, for the phantom and subjects with high spatial coherence, harmonic imaging at the higher available imaging frequencies improves image quality. Subjects with low image quality benefit from lower imaging frequencies. The results also indicate that the phantom and Subjects 1-7 all benefit from harmonic imaging over fundamental. Subject 8 enjoys a slight benefit from fundamental imaging. These results reflect the clinical experience, in which sonographers select low frequency probes for difficult-to-image patients and employ harmonic imaging far more than fundamental imaging. We will test the validity of using our quantitative metrics presented in Eqns. 2 and 3 with pilot pulse data obtained in real-time for selecting the optimal patient specific imaging mode and frequency in the Specific Aim 2 and 3 studies.

Figure 10:
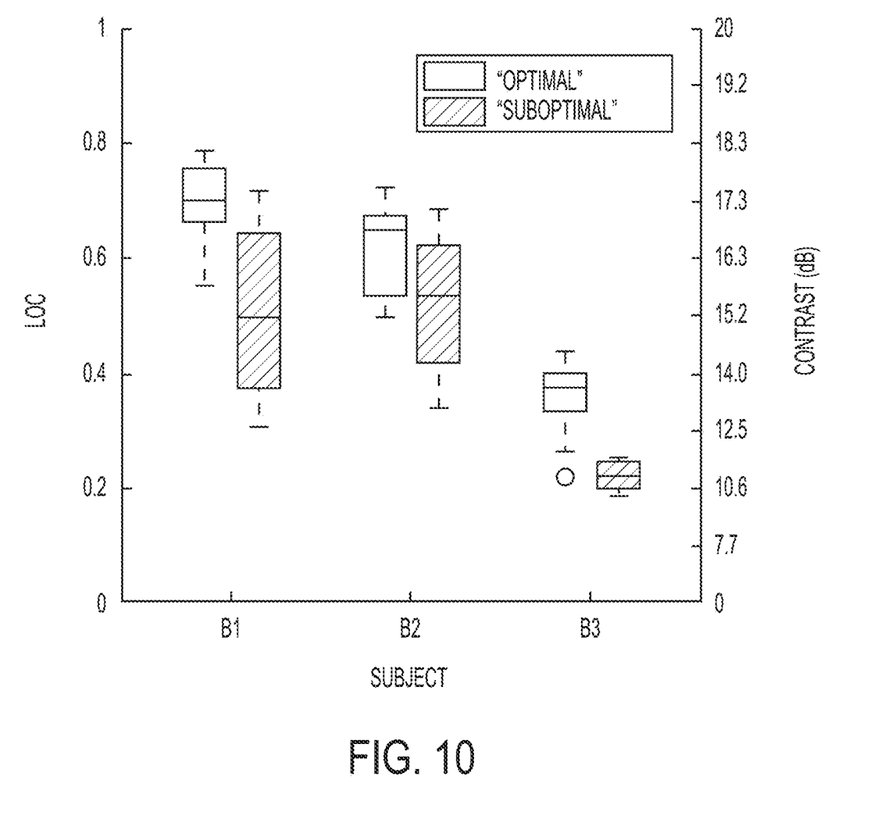
FIG. 10 is a bar graph of the measured LOCs for two spatially diverse sets of acoustic windows on three subjects.

Imaging Window Selection:

FIG. 10 shows the range of LOCs measured within sets of adjacent acoustic windows for three subjects. "Optimal" windows yielded better images, in Dr. Nelson's opinion during scanning, when compared to those labelled "Suboptimal". Using Eqn. 2, we calculate the expected image contrast of a lesion with a physical contrast of 20 dB as a function of LOC, shown by the right-hand y-axis. The results in FIG. 10 thus indicate the expected changes in lesion contrast as a function of the selected acoustic window. For example, Subject B3 would enjoy a roughly 3 dB improvement in lesion contrast when viewed from the "optimal" windows. These results reflect the clinical literature, cited above, which indicates that significant image quality improvements can be achieved when sonographers search for a favorable acoustic window and compress fat layers with the ultrasonic array.

The preliminary results demonstrate the utility of the LOC as an image quality parameter and provide an estimate of the image quality improvements realized when the LOC is used to adaptively select the MI and imaging frequency and when the LOC is used to guide acoustic window selection. Additional other imaging parameters (i.e. focus, compounding method and extent) may be used, and the clinical impact of these methods on a real-time, adaptive scanner may be tested.

In some embodiments, feedback may be provided during an ultrasound scan of one type of ultrasound acquisition for estimating the image quality of the second type of ultrasound acquisition and triggering the ultrasound acquisition of the second type based on the estimated image quality, for example, using LOC calculations. Imaging parameters that may be adjusted, e.g., by the user, to improve the prediction of image quality, include the scan voltage, selected scanning harmonics, focal location, frame rate, frequency transmit power, detected timing parameters or patterns, such as changes in predicted mage quality due to tissue movement (e.g., cardiac cycle), a location of the ultrasound transducer array 40, pressure applied to the array 40 on the tissue, and other timing parameters. A user can select a region of interest in a B-mode image of an ultrasound scan. A visual indicator may be used to indicate when parameters of the B-mode scan are optimized for the second type of scan, such are an ARFI image or SWEI image. For example, the outline of the region of interest may change color to indicate whether the characteristics that increase an estimated amount of image quality metrics in the target region for the second type of ultrasound acquisition are relatively high or low, such as by changing a color indicator from green (excellent characteristics for high image quality) to yellow (lower image quality) to red (poor image quality). The color may appear at any suitable location. In some embodiments, the color indicator is the outline of the region of interest.

The history of an LOC prediction of image quality over a time period in which the user changes imaging parameters, such as the probe voltage may be shown in a graph. A relatively high value of the LOC indicates a relatively high quality, and therefore, the user may initiate the second type of scan when the LOC is observed at a relatively high level or above a given threshold. The acceptable threshold level may be marked on the graph to guide the user. In some embodiments, data on different channels of the array may also be compared graphically or with an image.

In some embodiments, a semi-transparent overlay such as a color or intensity coded to indicate a spatial value of the prediction of image quality (e.g., LOC) may be used. For example, spatially-varying estimates in a region may be overlaid at locations where the estimates are made. In some embodiments, interpolated spatially-varying estimates in a region are overlaid on the image. Although a color or brightness overlay in a region may be used, it should be understood that any region or the entire scan may include the overlay indicating the prediction of image quality. In this configuration, the second type of ultrasound scan may be triggered based on the spatial prediction of image quality.

The foregoing is illustrative of the present invention and is not to be construed as limiting thereof. Although a few example embodiments of this invention have been described, those skilled in the art will readily appreciate that many modifications are possible in the example embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of triggering an imaging acquisition of a target region in an ultrasound transducer, the method comprising:
    acquiring a first type of ultrasound data with the ultrasound transducer using a first type of ultrasound acquisition;
    analyzing the first type of ultrasound data to identify an acquisition time and/or position having characteristics that increase an estimated amount of image quality metrics in the target region for a second type of ultrasound acquisition; and
    generating a signal to initiate acquiring a second type of ultrasound data by the ultrasound transducer at the identified acquisition time and/or position using a second type of ultrasound acquisition in response to the identified acquisition time and/or position identified from the first type of ultrasound data.

2. The method of claim 1, wherein the first type of ultrasound acquisition is B-Mode imaging acquisition and the second type of ultrasound acquisition is ARFI imaging acquisition.

3. The method of claim 1, wherein analyzing the first type of ultrasound data to identify an acquisition time and/or position having characteristics that increase an estimated amount of image quality metrics in the target region for a second type of ultrasound acquisition comprises using a machine learning classifier based on a database of the first type of ultrasound data and quality metrics of the second type of ultrasound data.

4. The method of claim 3, further comprising scoring the acquired second type of ultrasound data based on quality metrics and training the machine learning classifier based on the first type of ultrasound data acquired prior to the acquired second type of ultrasound data and the score of the acquired second type of ultrasound data.

5. The method of claim 4, wherein the first type of ultrasound data has a lower energy than the second type of ultrasound data.

6. The method of claim 1, wherein analyzing the first type of ultrasound data to identify an acquisition time and/or position having characteristics that increase an estimated amount of image quality metrics in the target region for a second type of ultrasound acquisition comprises predicting movement in the target region.

7. The method of claim 1, wherein analyzing the first type of ultrasound data to identify an acquisition time and/or position having characteristics that increase an estimated amount of image quality metrics in the target region for a second type of ultrasound acquisition comprises scoring an image quality of the first type of ultrasound data.

8. The method of claim 1, further comprising adjusting acquisition parameters for the second type of ultrasound acquisition in response to analyzing the first type of ultrasound data.

9. The method of claim 8, further comprising displaying an indication of the estimated amount of image quality metrics during the adjusting of acquisition parameters.

10. The method of claim 9, wherein the displayed indication of the estimated amount of image quality metrics during the adjusting of acquisition parameters comprises a color-coded indicator, a graph of the image quality metrics, and/or a spatial overlay indicator.

11. An ultrasound system for triggering an imaging acquisition of a target region in an ultrasound transducer, the system comprising:
    an ultrasound transducer array;
    a controller configured to control the ultrasound transducer to acquire a first type of ultrasound data with the ultrasound transducer using a first type of ultrasound acquisition; and
    a signal analyzer configured to analyze the first type of ultrasound data to identify an acquisition time and/or position having characteristics that increase an estimated amount of image quality metrics in the target region for a second type of ultrasound acquisition;
    wherein the controller is configured to further generate a signal to initiate acquiring a second type of ultrasound data by the ultrasound transducer at the identified acquisition time and/or position using a second type of ultrasound acquisition in response to the identified acquisition time and/or position identified from the first type of ultrasound data.

12. The system of claim 11, wherein the first type of ultrasound acquisition is B-Mode imaging acquisition and the second type of ultrasound acquisition is ARFI imaging acquisition.

13. The system of claim 11, wherein the signal analyzer comprises a machine learning classifier configured to analyze the first type of ultrasound data to identify an acquisition time and/or position having characteristics that increase an estimated amount of image quality metrics in the target region for a second type of ultrasound acquisition based on a database of the first type of ultrasound data and quality metrics of the second type of ultrasound data.

14. The system of claim 13, wherein the signal analyzer is configured to score the acquired second type of ultrasound data based on quality metrics and training the machine learning classifier based on the first type of ultrasound data acquired prior to the acquired second type of ultrasound data and the score of the acquired second type of ultrasound data.

15. The system of claim 14, wherein the first type of ultrasound data has a lower energy than the second type of ultrasound data.

16. The system of claim 11, wherein the signal analyzer is configured to analyze the first type of ultrasound data to identify an acquisition time and/or position having characteristics that increase an estimated amount of image quality metrics in the target region for a second type of ultrasound acquisition by predicting movement in the target region.

17. The system of claim 11, wherein the signal analyzer is configured to analyze the first type of ultrasound data to identify an acquisition time and/or position having characteristics that increase an estimated amount of image quality metrics in the target region for a second type of ultrasound acquisition by scoring an image quality of the first type of ultrasound data.

18. The system of claim 11, wherein the controller is configured to adjust acquisition parameters for the second type of ultrasound acquisition in response to analyzing the first type of ultrasound data.

19. The system of claim 18, wherein the controller is configured to display an indication of the estimated amount of image quality metrics during the adjusting of acquisition parameters.

20. The system of claim 19, wherein the displayed indication of the estimated amount of image quality metrics during the adjusting of acquisition parameters comprises a color-coded indicator, a graph of the image quality metrics, and/or a spatial overlay indicator.

21. A computer program product for determining a mechanical parameter for a sample having a target region, the computer program product comprising: a non-transient computer readable medium having computer readable program code embodied therein, the computer readable program code comprising:

computer readable program code configured to acquire a first type of ultrasound data with the ultrasound transducer using a first type of ultrasound acquisition;

computer readable program code configured to analyze the first type of ultrasound data to identify an acquisition time and/or position having characteristics that increase an estimated amount of image quality metrics in the target region for a second type of ultrasound acquisition; and computer readable program code configured to generate a signal to initiate acquiring a second type of ultrasound data by the ultrasound transducer at the identified acquisition time and/or position using a second type of ultrasound acquisition in response to the identified acquisition time and/or position identified from the first type of ultrasound data.

* * * * *

UNITED STATES PATENT AND TRADEMARK OFFICE
CERTIFICATE OF CORRECTION

PATENT NO.        : 10,969,487 B2
APPLICATION NO.   : 16/113497
DATED             : April 6, 2021
INVENTOR(S)       : Trahey et al.

Page 1 of 1

It is certified that error appears in the above-identified patent and that said Letters Patent is hereby corrected as shown below:

In the Specification

Column 10, Line 3: Please correct "$S/N_a$" to read -- $S/N_s$ --

Column 10, Line 4: Please correct "$N_a$" to read -- $N_s$ --

Signed and Sealed this
Third Day of August, 2021

Drew Hirshfeld
*Performing the Functions and Duties of the
Under Secretary of Commerce for Intellectual Property and
Director of the United States Patent and Trademark Office*